US010527371B2

(12) United States Patent
Kubo et al.

(10) Patent No.: US 10,527,371 B2
(45) Date of Patent: Jan. 7, 2020

(54) HEAT EXCHANGER MONITORING DEVICE THAT DETERMINES THE PRESENCE OR ABSENCE OF AN ANOMALY OF A HEAT TRANSFER SURFACE OF A HEAT TRANSFER TUBE

(71) Applicant: MITSUBISHI HITACHI POWER SYSTEMS, LTD., Yokohama (JP)

(72) Inventors: Hiroyoshi Kubo, Tokyo (JP); Hiromi Aota, Tokyo (JP); Yoshinori Koyama, Tokyo (JP); Kenichiro Kosaka, Tokyo (JP); Yasunari Shibata, Yokohama (JP); Yuichiro Urakata, Yokohama (JP)

(73) Assignee: MITSUBISHI HITACHI POWER SYSTEMS, LTD., Yokohama-Shi (JP)

( * ) Notice: Subject to any disclaimer, the term of this patent is extended or adjusted under 35 U.S.C. 154(b) by 104 days.

(21) Appl. No.: 15/329,678

(22) PCT Filed: Oct. 14, 2015

(86) PCT No.: PCT/JP2015/079039
§ 371 (c)(1),
(2) Date: Jan. 27, 2017

(87) PCT Pub. No.: WO2016/063772
PCT Pub. Date: Apr. 28, 2016

(65) Prior Publication Data
US 2017/0211900 A1    Jul. 27, 2017

(30) Foreign Application Priority Data
Oct. 20, 2014 (JP) .................. 2014-213512

(51) Int. Cl.
*F28F 27/00*   (2006.01)
(52) U.S. Cl.
CPC .................. *F28F 27/00* (2013.01)

(58) Field of Classification Search
CPC .... F28F 27/00; F28F 2200/00; G05B 23/024; F01K 13/003; Y02E 20/18; Y02E 20/16
See application file for complete search history.

(56) References Cited

U.S. PATENT DOCUMENTS

| 4,836,146 A * | 6/1989 | Russell | F22B 37/56 122/379 |
| 7,539,599 B2 * | 5/2009 | Hasegawa | G03G 15/55 700/10 |

(Continued)

FOREIGN PATENT DOCUMENTS

| JP | 5-126304 | 5/1993 |
| JP | 06-320056 | 11/1994 |

(Continued)

OTHER PUBLICATIONS

International Search Report dated Jan. 19, 2016 in International (PCT) Application No. PCT/JP2015/079039 with English translation.

(Continued)

*Primary Examiner* — Ljiljana V. Ciric
(74) *Attorney, Agent, or Firm* — Wenderoth, Lind & Ponack, L.L.P.

(57) ABSTRACT

An anomaly monitoring device is installed in an integrated gasification combined cycle plant that experiences varying loads, and the device monitors a heat exchanger that performs heat exchange between a carbon-containing fuel and a heat exchange medium flowing through a heat transfer tube. For each load on the integrated gasification combined cycle plant, the anomaly monitoring device calculates the average value and the standard deviation of a state quantity of the heat exchanger, calculates the Mahalanobis distance on the basis of the average value and the standard deviation, and from the calculated Mahalanobis distance determines (Continued)

the presence or absence of an anomaly of the heat transfer surface of the heat transfer tube.

3 Claims, 5 Drawing Sheets

(56) References Cited

U.S. PATENT DOCUMENTS

| | | | | |
|---|---|---|---|---|
| 7,558,700 | B2* | 7/2009 | Yamashita | F25B 49/005 |
| | | | | 702/183 |
| 7,974,729 | B2* | 7/2011 | Takahashi | G05B 23/0213 |
| | | | | 700/108 |
| 2005/0193027 | A1* | 9/2005 | Hasegawa | G03G 15/55 |
| 2007/0156373 | A1* | 7/2007 | Yamashita | F25B 49/005 |
| | | | | 702/182 |
| 2007/0282554 | A1* | 12/2007 | Koyama | G05B 23/0221 |
| | | | | 702/105 |
| 2009/0276076 | A1* | 11/2009 | Takahashi | G05B 23/0213 |
| | | | | 700/110 |
| 2013/0332773 | A1* | 12/2013 | Yuan | G05B 23/0229 |
| | | | | 714/26 |
| 2016/0216052 | A1* | 7/2016 | Kubo | F28F 27/00 |
| 2019/0086294 | A1* | 3/2019 | Kubo | G01M 99/00 |

FOREIGN PATENT DOCUMENTS

| | | |
|---|---|---|
| JP | 2000-114130 | 4/2000 |
| JP | 2001-74228 | 3/2001 |
| JP | 2002-317919 | 10/2002 |
| JP | 2004-232968 | 8/2004 |
| JP | 2005-207644 | 8/2005 |
| JP | 2006-309570 | 11/2006 |
| JP | 2006-349230 | 12/2006 |
| JP | 2008-249234 | 10/2008 |
| JP | 2010-181188 | 8/2010 |
| JP | 5031088 | 9/2012 |
| JP | 2015-081695 | 4/2015 |

OTHER PUBLICATIONS

Written Opinion of the International Searching Authority dated Jan. 19, 2016 in International (PCT) Application No. PCT/JP2015/079039 with English translation.

* cited by examiner

HEAT EXCHANGER MONITORING DEVICE THAT DETERMINES THE PRESENCE OR ABSENCE OF AN ANOMALY OF A HEAT TRANSFER SURFACE OF A HEAT TRANSFER TUBE

TECHNICAL FIELD

The present invention relates to a heat exchanger monitoring device and a heat exchanger monitoring method.

BACKGROUND ART

In various plants such as a gas turbine power plant, a nuclear power plant, a chemical plant, and an Integrated Gasification Combined Cycle (IGCC) plant, state quantities of the plant such as a temperature and a pressure are acquired in order to monitor whether or not the plant is normally operated.

For example, a heat exchanger which handles a generated carbon-containing fuel is provided in the IGCC plants. The heat exchanger performs heat exchange between the carbon-containing fuel (for example, fuel gas) and a heat exchange medium (for example, water) flowing through a heat transfer tube. However, since the carbon-containing fuel adheres to a heat transfer surface, an anomaly such as clogging of the heat transfer surface is likely to occur. Accordingly, the state of the heat exchanger which handles the carbon-containing fuel is also included in an object to be monitored to monitor whether or not the plant is normally operated.

Here, PTL 1 discloses a plant state monitoring method that monitors an operation state of a plant using a Mahalanobis distance based on a state quantity of the plant.

That is, in the plant state monitoring method disclosed in PTL 1, a first unit space preparation step and a second unit space preparation step are performed, in the first unit space preparation step, a first unit space, which is an aggregate of data becoming a reference when it is determined whether or not an operation state of the plant during a start-up operation period is normal, is prepared based on a state quantity during the start-up operation period of the plant, and in the second unit space preparation step, a second unit space, which is an aggregate of data becoming a reference when it is determined whether or not an operation state of the plant during a load operation period is normal, is prepared based on a state quantity of the plant during the load operation period.

In the first unit space preparation step, the first unit space is prepared based on the state quantity of the plant during a period from a time back to the past by a first period from a time when the state of the plant during the start-up operation of the plant is evaluated to a time back to the past by a second period from the same time. In addition, in the second unit space preparation step, the second unit space is prepared based on the state quantity of the plant during a period from a time back to the past by a third period from a time when the state of the plant during the load operation of the plant is evaluated to a time back to the past by a fourth period from the same time.

CITATION LIST

Patent Literature

[PTL 1] Japanese Patent No. 5031088

SUMMARY OF INVENTION

Technical Problem

FIG. 4 of PTL 1 is a conceptual diagram which shows a concept of a Mahalanobis distance, and shows a unit space in which a horizontal axis indicates an intake air temperature and a vertical axis indicates output of a gas turbine. The characteristic shown in FIG. 4 has a strong positive correlation and is linear.

However, even when the unit spaces are handled collectively in the gas turbine, in a case where the characteristic is not linear, in the method disclosed in PTL 1, a detection failure is likely to occur in a case where the plant state is abnormal. In particular, in a plant which is operated at a partial load, the state change of the plant may not be linear between load zones different from each other.

In addition, even in a case where the anomaly of the heat exchanger handling the carbon-containing fuel is monitored, if the state change of the plant is not linear, the detection failure is likely to occur in the method disclosed in PTL 1.

The present invention is made in consideration of the above-described circumstances, and an object thereof is to provide a heat exchanger monitoring device and a heat exchanger monitoring method capable of more reliably detecting an anomaly of a heat exchanger.

Solution to Problem

In order to solve the above-described problems, a heat exchanger monitoring device and a heat exchanger monitoring method of the present invention adopt the following means.

According to a first aspect of the present invention, there is provided a heat exchanger monitoring device which monitors a heat exchanger which is installed in a plant which experiences varying loads, and performs heat exchange between a carbon-containing fuel and a heat exchange medium flowing through a heat transfer tube, the device including: calculation means for calculating an average value and a standard deviation of a state quantity of the heat exchanger for each load on the plant and calculating a Mahalanobis distance based on the average value and the standard deviation; and anomaly determination means for determining the presence or absence of an anomaly of a heat transfer surface of the heat transfer tube from the Mahalanobis distance calculated by the calculation means.

The monitoring device of the present invention monitors the heat exchanger which is installed in the plant which experiences varying loads. The heat exchanger performs heat exchange between the carbon-containing fuel and the heat exchange medium flowing through the heat transfer tube.

Since carbon (soot) adheres to the heat transfer surface of the heat exchanger through which the carbon-containing fuel flows, an anomaly such as a case where sufficient heat exchange is not performed due to clogging of the heat transfer surface may occur. Accordingly, the present invention determines the presence or absence of the anomaly of the heat exchanger using the Mahalanobis distance.

Here, in a case where characteristics in parameter distributions in unit spaces to calculate the Mahalanobis distance have a strong positive correlation (linear), even when the unit spaces are collectively handled, it is possible to detect the anomaly of the heat exchanger without failure. However, in a case where the characteristics are not linear, if the unit spaces are collectively handled, detection failures with respect to the anomaly of the heat exchanger are likely to occur.

Accordingly, the average value and the standard deviation of the state quantity of the heat exchanger are calculated for each load of the plant by the calculation means, and the Mahalanobis distance is calculated based on the average value and the standard deviation. In addition, the anomaly determination means determines the presence or absence of the anomaly of the heat transfer surface of the heat transfer tube by the calculated Mahalanobis distance. That is, the unit space is set for each load of the plant.

Therefore, according to the present invention, the detection failure with respect to the anomaly of the heat exchanger is prevented, and it is possible to more reliably detect the anomaly of the heat exchanger.

In the first aspect, the state quantity may be at least one of multiple temperatures, differential pressures, and flow rates in a flow direction of the carbon-containing fuel, and multiple temperatures, differential pressures, and flow rates in a flow direction of the heat exchange medium.

According to this configuration, it is possible to appropriately determine the anomaly of the heat exchanger.

In the first aspect, a soot removing device which removes soot adhering to the heat transfer tube may be provided in the heat exchanger, and in a case where the anomaly determination means determines that anomaly occurs, an operation condition of the soot removing device may be changed.

According to this configuration, since the operation condition of the soot removing device is changed so as to remove the soot adhering to the heat transfer tube, it is possible to eliminate the anomaly of the heat exchanger.

According to a second aspect of the present invention, there is provided a heat exchanger monitoring method which monitors a heat exchanger which is installed in a plant which experiences varying loads, and performs heat exchange between a carbon-containing fuel and a heat exchange medium flowing through a heat transfer tube, the method including: a first step of calculating an average value and a standard deviation of a state quantity of the heat exchanger for each load on the plant and calculating a Mahalanobis distance based on the average value and the standard deviation; and a second step of determining the presence or absence of an anomaly of the heat transfer surface of a heat transfer tube from the calculated Mahalanobis distance.

Advantageous Effects of Invention

According to the present invention, remarkable effects are obtained, in which it is possible to more reliably detect an anomaly of a heat exchanger.

DESCRIPTION OF EMBODIMENTS

Hereinafter, an embodiment of a heat exchanger monitoring device and a heat exchanger monitoring method according to the present invention will be described with reference to the drawings.

Figure 1:
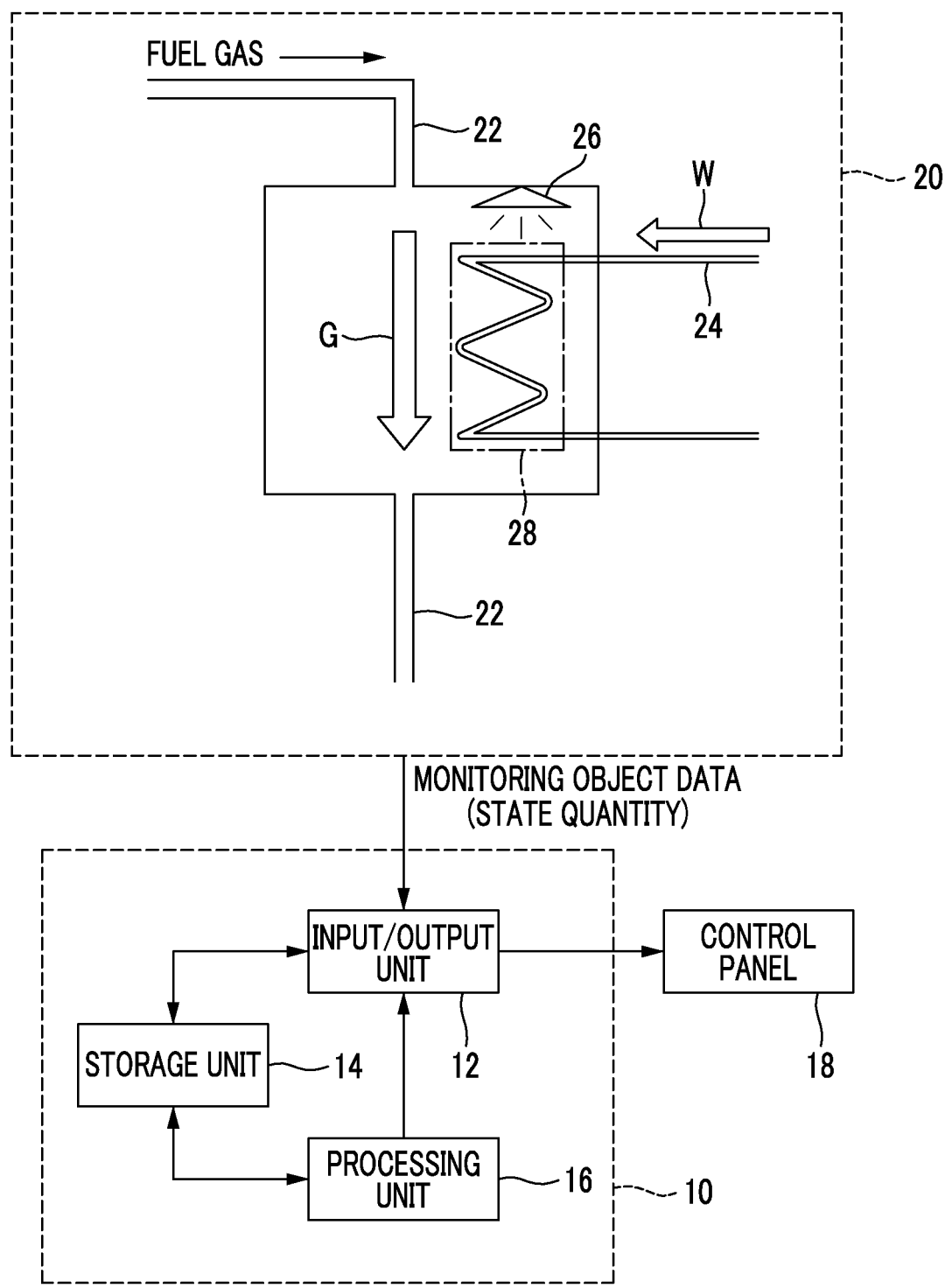
FIG. 1 is a schematic diagram showing a configuration of an anomaly monitoring device according to an embodiment of the present invention.

FIG. 1 is a schematic diagram showing the configuration of an anomaly monitoring device 10 according to the present embodiment. The anomaly monitoring device 10 monitors the state of a heat exchanger 20 during the operation of the heat exchanger 20, and determines whether or not the heat exchanger 20 is normally operated.

The heat exchanger 20 according to the present embodiment performs heat exchange between a carbon-containing fuel and a heat exchange medium (for example, water), and includes a fuel channel 22, a heat transfer tube 24, and a soot removing device 26.

The carbon-containing fuel is supplied to the heat exchanger 20 via the fuel channel 22. For example, as an example of the carbon-containing fuel, there is fuel gas, a powder fuel, or the like. The heat transfer tube 24 flows through the inside of the heat exchanger 20, and a heat transfer surface 28 is configured. In addition, heat exchange between the carbon-containing fuel flowing from the fuel channel 22 to the heat exchanger 20 and the heat exchange medium flowing through the heat transfer tube 24 is performed on the heat transfer surface 28.

The soot removing device 26 removes soot adhering to the heat transfer surface 28. The soot is carbon or the like which is included in the carbon-containing fuel. As the soot removing device 26, an injection-type soot removing device (for example, a soot blower) which injects compressed gas (nitrogen, steam, or the like) to the heat transfer surface 28 is used. However, the present invention is not limited to this, a vibration-type soot removing device which applies vibrations to the heat transfer surface 28, a hard ball dropping-type soot removing device which drops hard balls on the heat transfer surface 28, or the like may be used.

For example, state quantities of the heat exchanger 20 monitored by the anomaly monitoring device 10 include temperatures at multiple positions (for example, an inlet temperature, an intermediate temperature, an outlet temperature, or the like of the heat exchanger 20) in a primary-side flow direction G of the heat exchanger 20, a differential pressure between the inlet and the outlet in the primary-side flow direction G, a primary-side flow rate, temperatures at multiple positions (for example, an inlet temperature, an intermediate temperature, an outlet temperature, or the like of the heat transfer tube 24) in a secondary-side flow direction W, a differential pressure between the inlet and the outlet in the secondary-side flow direction W, a secondary-side flow rate, or the like. The state quantities are detected by state quantity detection means (a temperature sensor, a pressure sensor, and a flow-rate sensor, and hereinafter, collectively referred to as a "sensor"). The state quantity is a monitoring object to more appropriately determine the anomaly of the heat exchanger 20, and in descriptions below, data indicating the state quantity detected by the sensor is referred to as a monitoring object data.

In addition, the primary side of the heat exchanger indicates a high-temperature side. That is, in the present embodiment, the primary side of the heat exchanger 20 indicates the side to which the carbon-containing fuel flows. Meanwhile, the secondary side of the heat exchanger 20 indicates a low-temperature side. That is, in the present embodiment, the secondary side of the heat exchanger 20 is the side to which the heat exchange medium flows.

Here, for example, the heat exchanger 20 according to the present embodiment is installed in an Integrated Gasification Combined Cycle plant (hereinafter, referred to as an "IGCC plant") shown in FIG. 2.

Figure 2:
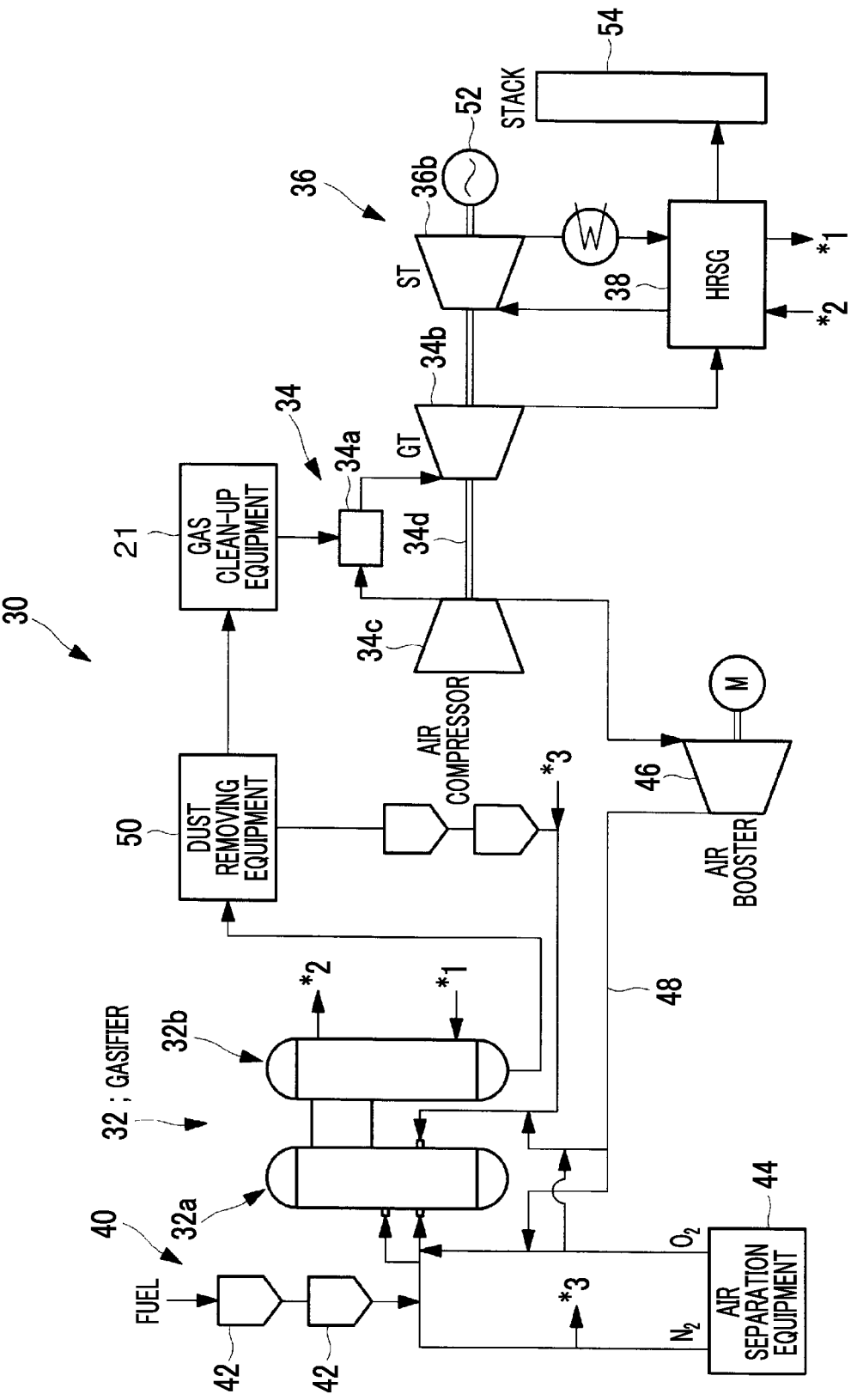
FIG. 2 is a diagram showing the overall schematic configuration of an IGCC plant including a heat exchanger according to the embodiment of the present invention.

As shown in FIG. 2, an IGCC plant 30 according to a first embodiment mainly includes a coal gasifier 32, gas turbine equipment 34, steam turbine equipment 36, and a heat recovery steam generator (hereinafter, referred to as "HRSG") 38.

Coal supply equipment 40 which supplies pulverized coal to the coal gasifier 32 is provided on the upstream side of the coal gasifier 32. The coal supply equipment includes a pulverizer (not shown) which pulverizes a coking coal to be pulverized coal of several micrometers to several hundred micrometers, and the pulverized coal by the pulverizer is stored in multiple hoppers 42.

The pulverized coal stored in each hopper 42 is transported to the coal gasifier 32 by a fixed flow rate along with nitrogen gas supplied from an air separation unit 44. The air separation unit 44 is a device which separates air into nitrogen gas and oxygen gas, and supplies the nitrogen gas and the oxygen gas to the coal gasifier 32.

The coal gasifier 32 includes a coalification portion 32a which is formed to cause gas to flow from the lower side to the upper side, and a gas cooler (SGC: Syn Gas Cooler) 32b which is connected to the downstream side of the coalification portion 32a and is formed to cause gas to flow from the upper side to the lower side.

A combustor and a reductor are provided in the coalification portion 32a from the lower side. The combustor combusts the pulverized coal and a portion of char, and pyrolyzes the remainder to discharge generated volatile matters (CO, $H_2$, lower hydrocarbon).

A combustor burner and a reductor burner are respectively provided in the combustor and the reductor, and the pulverized coal is supplied from the coal supply equipment 40 to the combustor burner and the reductor burner. Air extracted from an air compressor 34c of the gas turbine equipment 34 is supplied to the combustor burner via an air booster 46 and oxygen containing gas supply path 48 as oxygen containing gas along with oxygen gas separated by the air separation unit 44. In the reductor, the pulverized coal is gasified by high-temperature combustion gas from the combustor. Accordingly, combustible gas (hereinafter, referred to as "fuel gas") which becomes a gas fuel such as CO or $H_2$ from coal is generated.

Multiple heat exchangers 20 described above are installed in the gas cooler 32b, obtain sensible heat from the fuel gas introduced from the reductor so as to generate steam, and cool the fuel gas generated in the gasifier 3. Steam generated in the heat exchanger 20 is mainly used as steam for driving the steam turbine 36b. The fuel gas passing through the gas cooler 32b is introduced into dust removing equipment 50. The dust removing equipment 50 includes a porous filter and causes the fuel gas to pass through the porous filter. Accordingly, char including unburned portions mixed into the fuel gas is captured to be recovered.

In this way, the recovered char is returned to a char burner of the coal gasifier 32 so as to be recycled.

The fuel gas passing through the dust removing equipment 50 is cleaned-up by a gas clean-up unit 21, and is fed to a combustor 34a of the gas turbine equipment 34.

The gas turbine equipment 34 includes the combustor 34a which combusts the fuel gas, a gas turbine 34b which is driven by the combustion gas, and an air compressor 34c which feeds high-pressure air to the combustor 34a. The gas turbine 34b and the air compressor 34c are connected to each other by the same rotary shaft 34d. The air compressed by the air compressor 34c is extracted and is introduced to the air booster 46 separately from the combustor 34a.

The combusted flue gas passing through the gas turbine 34b is introduced into the HRSG 38, and high-pressure steam is supplied from the coal gasifier 32 and the HRSG 38 to the steam turbine 36b. For example, the gas turbine 34b and the steam turbine 36b are connected to the rotary shaft 34d, and a generator 52 which outputs power is provided on the side opposite to the gas turbine equipment 34 in a state where the steam turbine equipment 36 is interposed therebetween.

In addition, the HRSG 38 generates steam by the combusted flue gas from the gas turbine 34b, and discharges the combusted flue gas from a stack 54 to the atmosphere.

In this way, for example, the heat exchanger 20 according to the present embodiment is included in the gas cooler 32b in the coal gasifier 32 of the IGCC plant 30. In addition, the heat exchanger 20 performs heat exchange between the fuel gas which is the carbon-containing fuel and the heat exchange medium.

In the heat exchanger 20 through which the carbon-containing fuel flows, carbon adheres to the heat transfer surface 28, and if the carbon is not removed by the soot removing device 26, an anomaly such as a case where sufficient heat exchange is not performed due to clogging of the heat transfer surface 28 may occur. Accordingly, the anomaly monitoring device 10 determines the presence or absence of an anomaly of the heat exchanger 20 using a Mahalanobis distance.

As shown in FIG. 1, the anomaly monitoring device 10 includes an input/output unit (I/O) 12, a storage unit 14, and a processing unit 16.

Monitoring object data indicating the state quantity of the heat exchanger 20 is input to the input/output unit 12 from various sensors attached to the heat exchanger 20. The various sensors regularly detect the state quantity at predetermined time intervals from the starting of the IGCC plant 30 and output the state quantity to the input/output unit 12. The input/output unit 12 outputs the monitoring object data to the storage unit 14.

In addition, the input/output unit 12 outputs processing results by the processing unit 16 to a control panel 18. The control panel 18 can display various information for controlling the IGCC plant 30.

In the storage unit 14, the input monitoring object data is stored for each time series and for each load of the IGCC plant 30. In addition, in descriptions below, multiple monitoring object data stored for each time series is referred to as a monitoring object data group.

The processing unit 16 performs calculation processing (the details will be described below) which calculates the Mahalanobis distance of the monitoring object data group, and stores the calculated Mahalanobis distance in the storage unit 14.

In addition, for example, the processing unit 16 is configured of a Central Processing Unit (CPU), a Random Access Memory (RAM), a Read Only Memory (ROM), a computer readable recording medium, or the like. In addition, for example, a series of processing for realizing various functions is stored in a recording medium or the like in a format of program, the CPU reads the program to RAM or the like, processing and calculation processing of the information is performed, and various functions are realized. In addition, as the program, a form which is installed in a ROM or other recording mediums in advance, a form which is provided in a state of being stored in a computer readable recording medium, a form which is distributed via wire or wireless communication means, or the like may be applied. As the computer readable recording medium, there is a magnetic disk, a magneto-optic disk, a CD-ROM, a DVD-ROM, a semiconductor memory, or the like.

Figure 3:
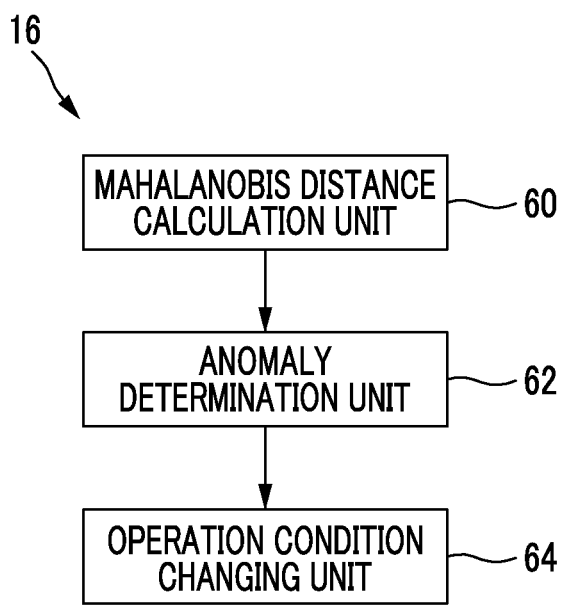
FIG. 3 is a functional block diagram showing a function of a processing unit according to the embodiment of the present invention.

FIG. 3 is a functional block diagram showing the function of the processing unit 16.

The processing unit 16 includes a Mahalanobis distance calculation unit 60, an anomaly determination unit 62, and an operation condition changing unit 64.

The Mahalanobis distance calculation unit 60 calculates an average value and a standard deviation of the monitoring object data group for each load of the IGCC plant 30, and calculates the Mahalanobis distance based on the average value and the standard deviation.

In addition, the monitoring object data group for calculating the average value and the standard deviation is determined as a normal value in the past.

Here, in a case where the distribution characteristic of the monitoring object data group in the unit space to calculate the Mahalanobis distance is a strong positive correlation (linear), even when the unit spaces are collectively handled, it is possible to detect the anomaly of the heat exchanger 20 without failure. However, in a case where the characteristic is not linear, if the unit spaces are collectively handled, detection failures with respect to the anomaly of the heat exchanger 20 are likely to occur.

Figure 4:
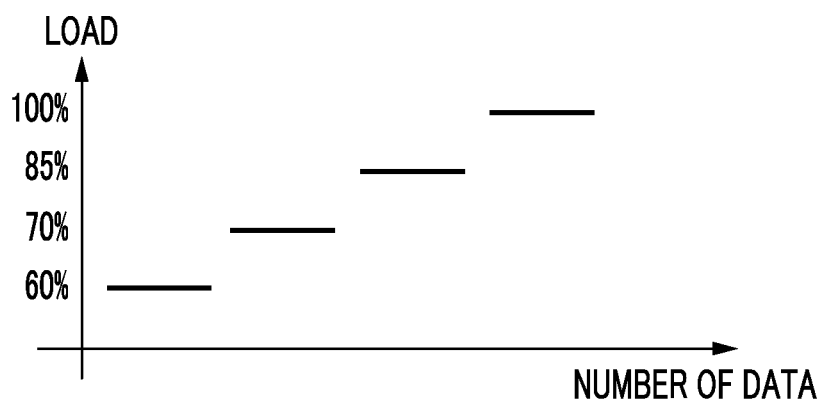
FIG. 4 is a schematic diagram showing a partial load of the IGCC plant.

For example, as shown in FIG. 4, in the IGCC plant 30, in a case where an operation is performed at a partial load (for example, 85%, 70%, or 60% of the overall load (100%)), multiple monitoring object data which indicate the state quantity of the heat exchanger 20 for each partial load is detected. That is, if load zones are different from each other in the IGCC plant 30, the characteristic is nonlinear at the state quantities in the load zones different from each other. In the example of FIG. 4, the number (sample number) of the monitoring object data in each load is the same as each other FIG. 5 is an example of a schematic diagram showing a range of a unit space which is assumed as normal in a case where a horizontal axis indicates a load and a vertical axis indicates a state quantity.

Figure 5:
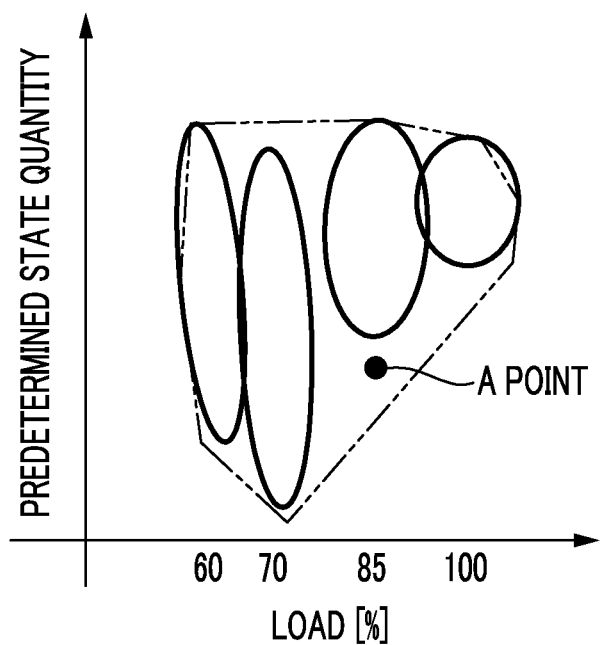
FIG. 5 is a schematic diagram showing a range of a unit space in a case where a horizontal axis indicates a load and a vertical axis indicates a state quantity.

In a case where all load zones are collectively handled as one unit space, the range of the unit space assumed as normal is within a broken line shown in FIG. 5. Meanwhile, in a case where each load zone is handled as one unit space, the range of the unit space assumed as normal is within solid lines shown in FIG. 5.

As shown in FIG. 5, compared to the case where all load zones are handled as one unit space, in the case where each load zone is handled as one unit space, the range of the unit space assumed as normal is narrower.

That is, the state quantity of an A point in FIG. 5 is determined as an anomaly in the case where each load zone is handled as one unit space. Meanwhile, in the case where all load zones are handled as one unit space, the state quantity at the A point is not determined as an anomaly and is determined as a normality, and a detection failure of the anomaly occurs.

Accordingly, in the present embodiment, in order to maintain linearity in the unit space, the unit space is divided for each load of the IGCC plant 30. In addition, the average value and the standard deviation of the monitoring object data group is calculated as a function (average value m=$F_1$ (load), standard deviation σ=$F_2$ (load)) for each load of the IGCC plant 30 by Mahalanobis distance calculation unit 60.

Figure 6:
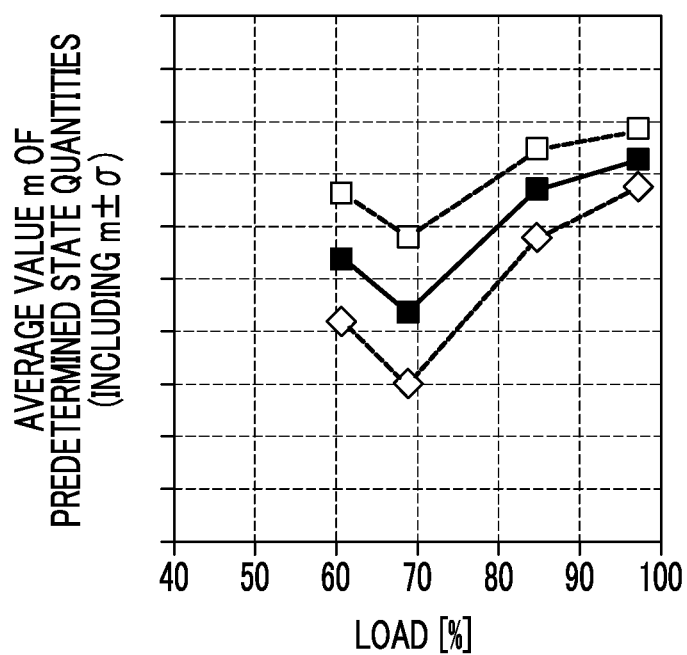
FIG. 6 is a graph showing an average value m of predetermined state quantities for each load of the IGCC plant according to the embodiment of the present invention.
Figure 7:
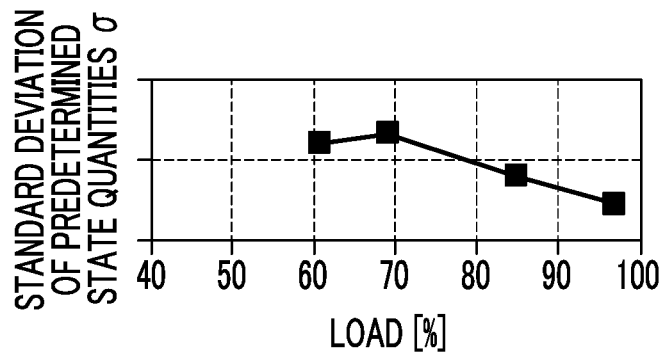
FIG. 7 is a graph showing a standard deviation σ of predetermined state quantities for each load of the IGCC plant according to the embodiment of the present invention.

FIG. 6 is a graph showing the average value m of predetermined state quantities (the monitoring object data group, and for example, temperature differences at multiple positions in the primary-side flow direction G of the heat exchanger 20) for each load of the IGCC plant 30. FIG. 7 is a graph showing the standard deviation σ of a predetermined state quantity for each load of the IGCC plant 30.

As shown in FIGS. 6 and 7, since the flow rate of the fuel gas flowing through the heat exchanger 20 is changed according to the load of the IGCC plant 30, the average values m and the standard deviations σ of the state quantities are different from each other.

In addition, for example, the Mahalanobis distance MD is calculated by the following Expression (1) based on the calculated average value m and the calculated standard deviation σ.

$$MD = \frac{(x-m)^2}{\sigma^2} \qquad (1)$$

In Expression (1), x is a current state quantity. As shown in Expression (1), the Mahalanobis distance increases as the difference between the current state quantity and the average value m increases.

In addition, the number of the kinds of the state quantities used in the calculation of the Mahalanobis distance may be one, or two or more.

The anomaly determination unit 62 determines the presence or absence of the anomaly of the heat transfer surface 28 of the heat transfer tube 24 by the Mahalanobis distance (hereinafter, referred to as a "calculated Mahalanobis distance") calculated by the Mahalanobis distance calculation unit 60. Specifically, in a case where the calculated Mahalanobis distance is a predetermined determination threshold value or more, the anomaly determination unit 62 determines that an anomaly occurs on the heat transfer surface 28.

The determination threshold value is determined based on the Mahalanobis distance at the time of normality in the past, and is stored in the storage unit 14 for each load of the IGCC plant 30 in advance. For example, the Mahalanobis distance at the time of normality may be the determination threshold value, and a value which adds a tolerance to the Mahalanobis distance at the time of normality may be the determination threshold value.

In a case where an anomaly is determined by the anomaly determination unit 62, the operation condition changing unit 64 changes the operation condition of the soot removing device 26 so as to remove soot adhering to the heat transfer tube 24 of the heat exchanger 20. For example, as a method of changing the operation condition of the soot removing device 26, there is a method of increasing a frequency of use of the soot removing device 26, a method of increasing the pressure of injected compressed gas in a case where the soot removing device 26 is a soot blower, or the like. Accordingly, the anomaly monitoring device 10 can eliminate the anomaly of the heat exchanger 20.

Figure 8:
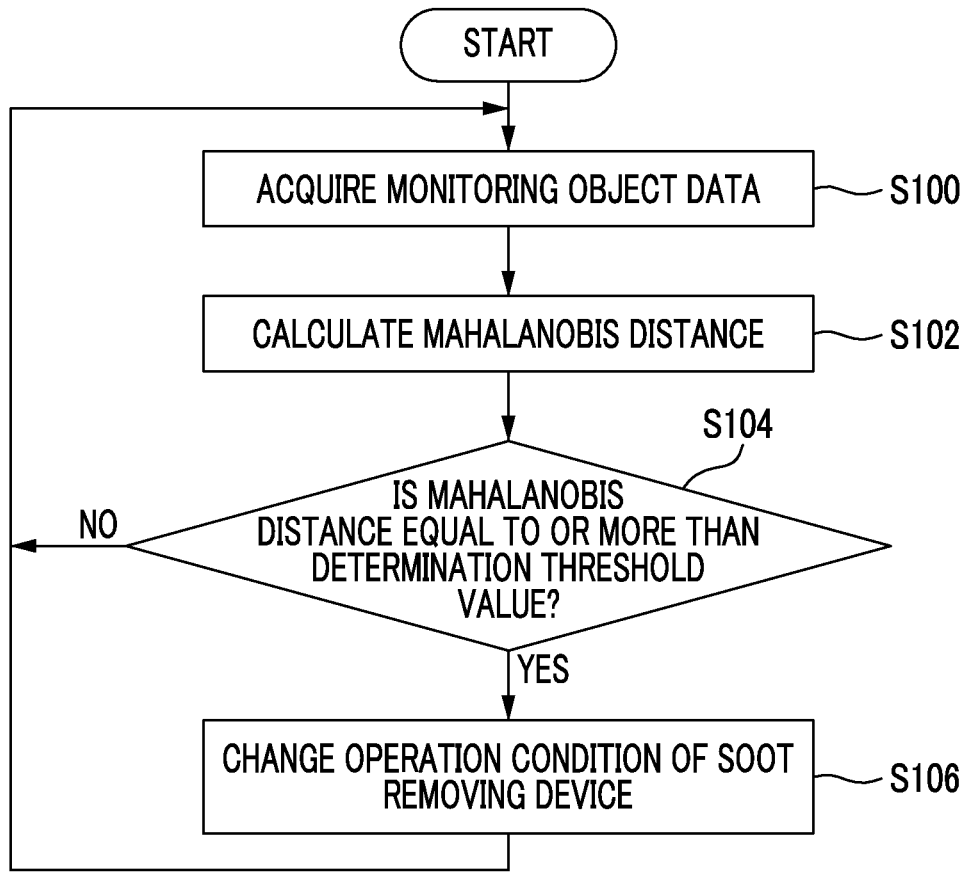
FIG. 8 is a flowchart showing a flow of heat exchanger monitoring processing according to the embodiment of the present invention.

FIG. 8 is a flowchart showing a flow of monitoring processing of the heat exchanger 20 (hereinafter, referred to as "heat exchanger monitoring processing") performed by the anomaly monitoring device 10 according to the present embodiment.

First, in Step 100, the monitoring object data indicating the state quantities of the heat exchanger 20 is acquired from various sensors which are provided in the heat exchanger 20 at time intervals which are determined in advance. The acquired monitoring object data is stored in the storage unit 14 for each time series and for each load of the IGCC plant 30.

In the next Step 102, the processing unit 16 calculates the Mahalanobis distance in the current monitoring object data based on the monitoring object data group stored in the storage unit 14.

In the next Step 104, the processing unit 16 reads the determination threshold value corresponding to the load of the Mahalanobis distance calculated in Step 102 from the storage unit 14, compares the calculated Mahalanobis distance with the determination threshold value, and determines the presence or absence of the anomaly of the heat transfer surface 28. That is, in a case where the calculated Mahalanobis distance is the determination threshold value or more, it is determined that the anomaly occurs, and the step proceeds to Step 106. Meanwhile, in a case where the calculated Mahalanobis distance is less than the determination threshold value, it is determined that the anomaly does not occur, the step is returned to Step 100, and the acquisition of the monitoring object data, the calculation of the Mahalanobis distance, and the determination of anomaly are repeated.

Moreover, the calculation of the Mahalanobis distance may not be performed for each acquisition of the monitoring object data, and may be performed for each predetermined period which is determined in advance.

Moreover, in Step 104, in a case where the calculated Mahalanobis distance being the determination threshold value or more is continued during a predetermined time or more (for example, one hour or more), or in a case where the frequency of the calculated Mahalanobis distance being the determination threshold value or more is a predetermined frequency or more within a predetermined period, it may be determined that an anomaly occurs. Accordingly, an erroneous detection of the anomaly is prevented.

In Step 106, an alarm that an anomaly occurs in the heat exchanger 20 is issued to the control panel 18, the operation condition of the heat exchanger 20 is changed, and the step is returned to Step 100.

As described above, the anomaly monitoring device 10 according to the present embodiment monitors the heat exchanger 20 which is installed in the IGCC plant 30 which experiences varying load and performs heat exchange between the carbon-containing fuel and the heat exchange medium flowing through the heat transfer tube 24. In addition, the anomaly monitoring device 10 calculates the average value and the standard deviation of a state quantity of the heat exchanger 20 for each load on the IGCC plant 30, calculates the Mahalanobis distance based on the average value and the standard deviation, and determines the presence or absence of the anomaly of the heat transfer surface 28 of the heat transfer tube 24 from the calculated the Mahalanobis distance.

Accordingly, since the detection failure of the anomaly of the heat exchanger 20 is prevented by the anomaly monitoring device 10, it is possible to more reliably detect the anomaly of the heat exchanger 20.

Hereinbefore, the present invention is described with reference to the embodiments. However, the technical scope of the present invention is not limited to the scope described in the embodiments. Various modifications and various improvements may be added to the embodiments within the scope which does not depart from the gist of the present invention, and the modifications and improvements are also included in the technical scope of the present invention. In addition, the embodiments may be appropriately combined.

For example, in the embodiment, the aspect in which the heat exchanger 20 is included in the IGCC plant 30 is described. The present invention is not limited to this, the kind of the plant is not limited as long as the heat exchanger 20 which performs heat exchange between the carbon-containing fuel and the heat exchange medium is provided in the plant, and, for example, the heat exchanger may be included in a boiler or like.

In addition, in the embodiment, the correlation between the load of the plant and the amount of the carbon-containing fuel flowing through the heat exchanger is set such that the amount of the carbon-containing fuel flowing through the heat exchanger 20 increases as the load of the plant increases. Accordingly, the Mahalanobis distance may be calculated based on the average value and the standard deviation of the monitoring object data group for each amount of the carbon-containing fuel flowing through the heat exchanger 20 instead of the average value and the standard deviation of the monitoring object data group for each load of the plant.

Moreover, the flow of the heat exchanger monitoring processing described in the embodiment is only an example. That is, an unnecessary step may be removed, a new step may be added, or a processing sequence may be replaced within a scope which does not depart from the gist of the present invention.

REFERENCE SIGNS LIST

10: Anomaly monitoring device
16: Processing unit
20: Heat exchanger
24: Heat transfer tube
28: Heat transfer surface
30: IGCC plant
60: Mahalanobis distance calculation unit
62: Anomaly determination unit

The invention claimed is:

1. A heat exchanger monitoring device for monitoring a heat exchanger which is installed in a plant which experiences varying loads, and performs heat exchange between a carbon-containing fuel and a heat exchange medium flowing through a heat transfer tube, the device comprising:
    calculation means for calculating an average value and a standard deviation of a state quantity of the heat exchanger for each load of the plant and calculating a Mahalanobis distance based on the average value and the standard deviation; and
    anomaly determination means for determining the presence or absence of an anomaly of a heat transfer surface of the heat transfer tube from the Mahalanobis distance calculated by the calculation means.

2. The heat exchanger monitoring device according to claim 1,
wherein the state quantity is at least one of multiple temperatures, differential pressures, and flow rates in a flow direction of the carbon-containing fuel, and multiple temperatures, differential pressures, and flow rates in a flow direction of the heat exchange medium.

3. The heat exchanger monitoring device according to claim 1,
wherein a soot removing device which removes soot adhering to the heat transfer tube is provided in the heat exchanger, and
wherein in a case where the anomaly determination means determines that anomaly occurs, an operating condition of the soot removing device is changed.

* * * * *